United States Patent
Backer et al.

(10) Patent No.: US 8,839,156 B2
(45) Date of Patent: Sep. 16, 2014

(54) POINTER TOOL FOR TOUCH SCREENS

(75) Inventors: Jonathan Todd Backer, Burbank, CA (US); Robert F. Fleischacker, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 806 days.

(21) Appl. No.: 13/020,265

(22) Filed: Feb. 3, 2011

(65) Prior Publication Data

US 2012/0200603 A1    Aug. 9, 2012

(51) Int. Cl.
*G06F 3/033* (2013.01)
*G06F 3/048* (2013.01)

(52) U.S. Cl.
USPC ........... 715/863; 715/773; 715/764; 715/856; 715/857; 715/858; 345/173

(58) Field of Classification Search
USPC ........... 715/764, 863, 773, 856–858; 345/173
See application file for complete search history.

(56) References Cited

U.S. PATENT DOCUMENTS

| | | | |
|---|---|---|---|
| 2008/0036743 A1* | 2/2008 | Westerman et al. | 345/173 |
| 2008/0180406 A1* | 7/2008 | Han et al. | 345/173 |
| 2011/0080341 A1* | 4/2011 | Helmes et al. | 345/163 |

* cited by examiner

*Primary Examiner* — Kieu Vu
*Assistant Examiner* — Joy M Weber
(74) *Attorney, Agent, or Firm* — Ference & Associates LLC

(57) ABSTRACT

Pointing tools for use in connection with touch screen displays are described. The pointing tools are provided with a visually offset pointer tip that can be rotated easily by user manipulation provided to the computing device through an interface. The pointing tools may include one or more buttons. The button(s) may be visually connected with the pointing tool on the display screen and/or logically associated therewith. The pointing tools described provide for accurate and precise inputs, and are useful in many applications, such as those where fine positioning and input within a touch screen environment is desirable.

18 Claims, 5 Drawing Sheets

POINTER TOOL FOR TOUCH SCREENS

FIELD OF THE INVENTION

The subject matter presented herein general relates to pointing tools for touch screen interfaces.

BACKGROUND

Computing devices, such as laptops, desktops, netbooks, slates, smartphones, kiosks, and the like, have adopted several input interfaces. Increasingly popular are touch screen display interfaces ('touch screens'). Different types of touch screens are implemented in several different environments, often depending on the size and type of interface desired. Some non-limiting examples of different types of touch screens include resistive touch screens, capacitive touch screens, infrared touch screens, and optical touch screens.

Many devices, such as those listed above, incorporate multi-touch touch screens. Multi-touch touch screens are able to simultaneously register multiple points of input, for example, three or more distinct positions of input touches.

Touch screen interfaces are popular for use in mobile devices. For example, in mobile devices having a touch screen, the touch screen is used to combine a display with an interface, such that a user's gestures on the combined display/interface, however sensed, are registered and sent to software, which then allows the device to respond to the input gestures.

No matter the particular technology utilized in a touch screen, or the device(s) that implement it, a user must interface with the touch screen to provide input. Common examples for accomplishing user input include use of a stylus (or pen) and use of one or more fingers. For example, when using a touch screen, a user employs one or more fingers to accomplish a task, for example, writing, scrolling, expanding the display (zooming in), compressing the display (zooming out), pointing, drawing, coloring, painting, et cetera.

Conventional displays allow users to position a pointing device (for example a mouse cursor), using for example an input device such as a mouse, to allow performance of certain operations (selection, highlighting, drawing, coloring, et cetera). However, touch screen devices conventionally provide no pointing device on the display, or provide a pointing device or like indicator directly underneath the point of contact with the touch screen. For example, a user drawing on a conventional touch screen display with a stylus provides input using the stylus, and the touch screen indicates input directly under the stylus point of contact (for example, draws a line directly underneath the tip of the stylus, mimicking conventional pen and ink writing).

BRIEF SUMMARY

An aspect provides a method of providing a pointing tool on a touch screen, the method comprising: ascertaining a first input with a touch screen; displaying a pointing tool on the touch screen, the pointing tool including: a pointer tip that rotates responsive to an input; and a finger pad for manipulating positioning of the pointing tool on the touch screen; and responsive to ascertaining operational input, performing one or more operations.

Another aspect provides an apparatus comprising: one or more processors; a memory operatively connected to the one or more processors; and a touch screen operatively connected to the one or more processors; wherein, responsive to execution of instructions accessible to the one or more processors, the one or more processors are configured to: ascertain a first input with a touch screen; display a pointing tool on the touch screen, the pointing tool including: a pointer tip that rotates responsive to an input; and a finger pad for manipulating positioning of the pointing tool on the touch screen; and responsive to ascertaining operational input, perform one or more operations.

A further aspect provides a computer program product comprising: a computer readable storage medium having computer readable program code embodied therewith, the computer readable program code comprising: computer readable program code configured to ascertain a first input with a touch screen; computer readable program code configured to display a pointing tool on the touch screen, the pointing tool including: a pointer tip that rotates responsive to an input; and a finger pad for manipulating positioning of the pointing tool on the touch screen; and computer readable program code configured to, responsive to ascertaining operational input, perform one or more operations.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
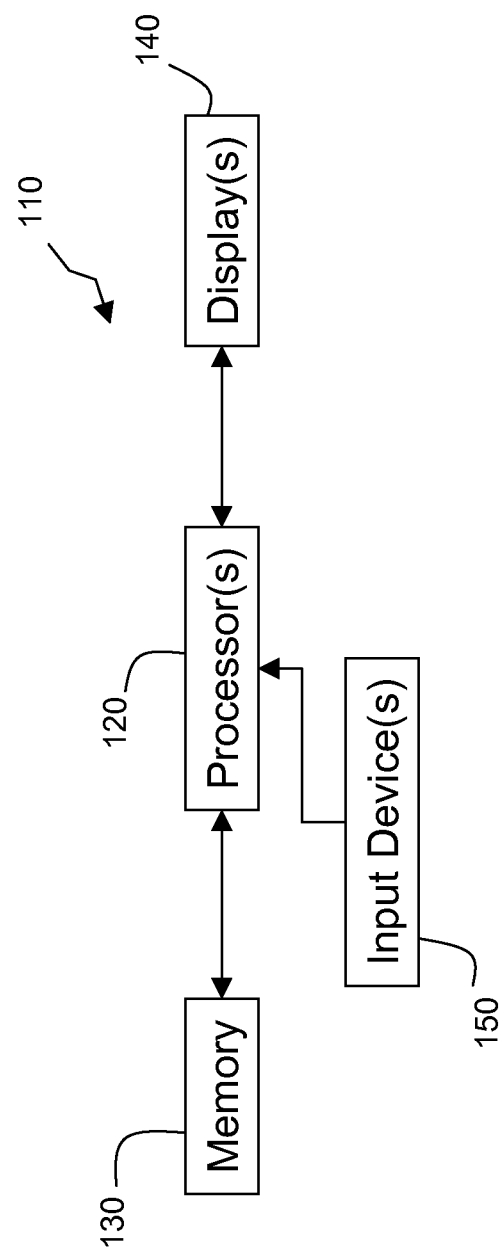
FIG. 1 illustrates an example block diagram of a computer system.

It will be readily understood that the components of the example embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the invention, as claimed, but is merely representative of certain example embodiments.

Reference throughout this specification to "one embodiment", "an embodiment", "an aspect" (or the like) means that a particular feature, structure, or characteristic described in connection with the embodiment, aspect, or the like, is included in at least one embodiment. Thus, appearances of the phrases "in one embodiment" or "in an embodiment" or the like in various places throughout this specification are not necessarily all referring to the same embodiment.

Furthermore, in the following description, numerous specific details are provided to give a thorough understanding of various example embodiments. One skilled in the relevant art will recognize, however, that various other embodiments can be practiced without one or more of the specific details, or with other methods, components, materials, et cetera. In other instances, well-known structures, materials, or operations are not shown or described in detail to avoid obfuscation.

When using a touch screen, users often encounter difficulty because the user's finger or stylus blocks the view of the display where the user is placing the finger or stylus. For example, when a user is drawing in a drawing application on a touch screen, the line created by the user is blocked by the user's stylus. The problem is most apparent while using fingers to manipulate objects displayed on a touch screen, however, even use of a stylus (or pen) does not alleviate this difficulty. For example, often the line drawn (or other action) is smaller than the point of the stylus; thus, the stylus obstructs the view of the line.

An offset pointing device, referred to as FINGERMOUSE pointing device and produced by FirstSpark, provides an extension that draws a familiar mouse pointer on the screen that a user can guide with his or her finger. The pointer 'floats' about an inch above the finger (contact point with the touch screen) as the user moves his or her finger about the touch screen.

Such an approach has several drawbacks. For example, while a visually offset pointer addresses the difficulty of obstruction of the pointing area by a finger or a stylus, a 'floating' pointer is visually difficult to control because it is not visually connected to the contact point. Moreover, FINGERMOUSE pointing device cannot be rotated; thus, a user encounters difficulty when attempting to point at and/or provide input(s) at certain locations on the touch screen. Another drawback of FINGERMOUSE pointing device is that it does not provide adequate functionality, as it automatically selects (clicks) when a user lifts his or her finger off of the touch screen. This presents a difficult situation for the user wanting to lift his or her hand off of the touch screen without selecting and/or without losing the exact positioning of the pointer on the touch screen.

Accordingly, embodiments provide a pointing tool that addresses the foregoing drawbacks and provides an easy to use tool for use in connection with touch screen devices. According to an example embodiment, the pointing tool does not appear or 'float' above the contact point (user's finger), but rather a pointer tip appears at the end of the overall pointing tool, which is centered about the contact point, which may be a finger pad area connected to the pointing tip, as an example. In an embodiment, the pointer tip appears at the end of a tear drop shaped pointer tool that is moved with the finger or stylus, making visualization and control of the pointer tip easier for precise, accurate pointing, selecting, drawing, et cetera.

In an embodiment, the pointing tool is provided with buttons. Each associated button has one or more predetermined functions associated therewith. For example, a selection or click function is executed responsive to a user touching a button. This allows a user to employ accurate location of the pointer tip, while using another area of the pointing device (one or more of the buttons) for executing functions. Moreover, a user can lift his or her finger off of the touch screen without executing a function, or losing exact positioning of the pointing tool on the touch screen, as the pointing tool may remain in its last position. The pointing tool buttons can be configured to execute a variety of different functions, such as selecting, switching colors, brushes, toggling of drawing tools, et cetera, and these functions/operations may be user configurable.

The illustrated example embodiments will be best understood by reference to the figures. The following description is intended only by way of example, and simply describes certain example embodiments.

Referring now to FIG. 1, an example block diagram of a computing device is illustrated. As illustrated, computing device 110 includes one or more processors 120 operatively connected to memory 130 (ROM, RAM, DRAM, et cetera) for storing information, display 140 for displaying image(s) thereon, and input device(s) 150 for inputting information. Those having ordinary skill in the art will readily understand that computing device 110 may contain more components than those illustrated in FIG. 1.

Computing device 110 includes a touch screen, in which display 140 and input device 150 are essentially co-located. Computing device 110 displays a pointing tool, as further described herein, on display 140 such that a user can interface with pointing device on display 140 as an input device 150. Using the pointing tool, and/or other input devices as described herein, user provides inputs to computing device 110, which in turn utilizes processor(s) 120 and application(s) stored in memory to execute actions (functions, operations) responsive to the inputs. These actions include for example updating the display and/or executing operations associated with the input(s).

Figure 2:
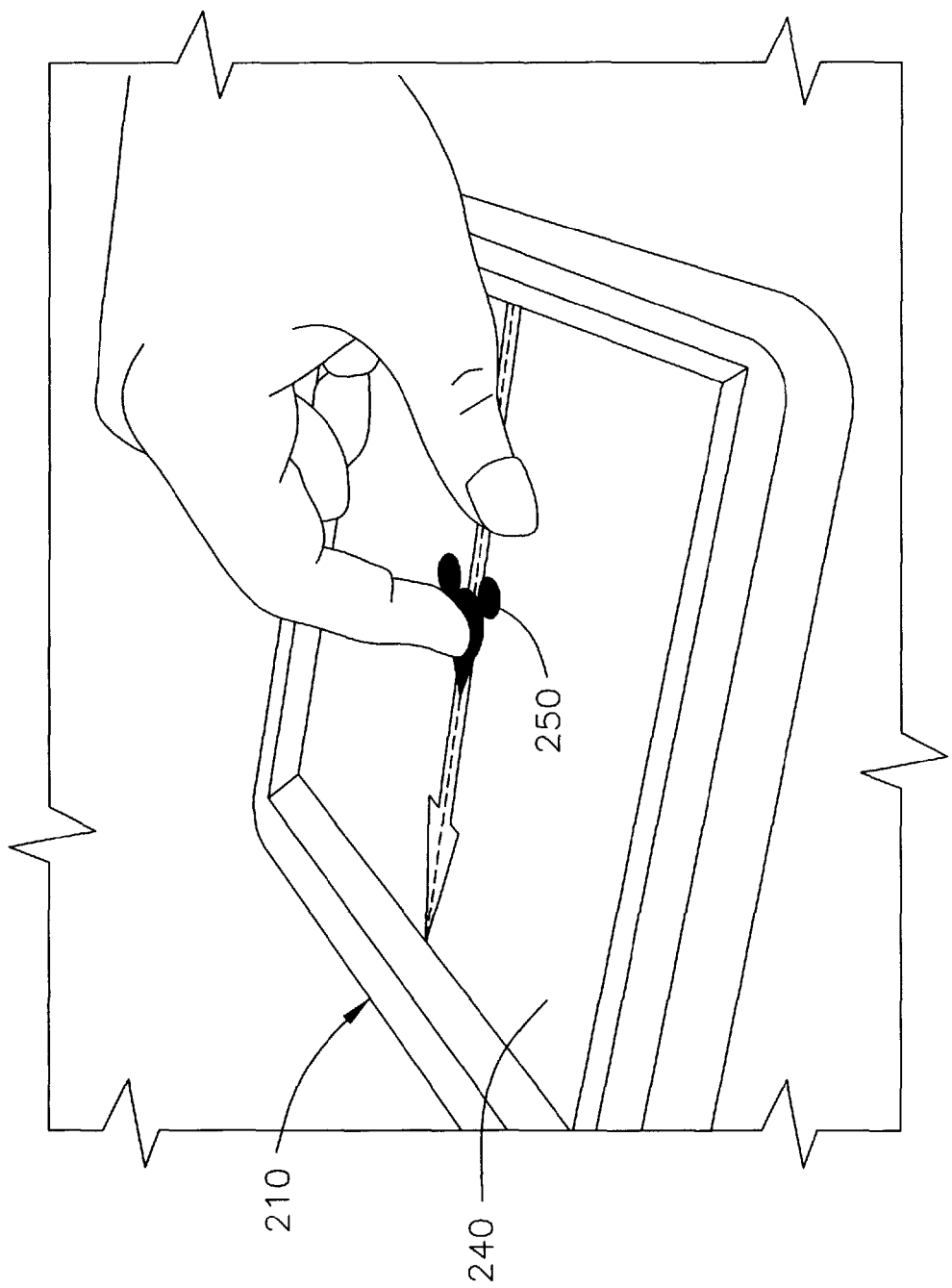
FIG. 2 illustrates a computer system having an example pointing tool in a first orientation.

FIG. 2 illustrates an example computing device 210 having a touch screen 240. Computing device 210 displays a pointing tool 250 as a user interface on touch screen 240. The pointing tool may be first displayed responsive to ascertaining user contact or may be displayed continuously on touch screen 240 (for example, from the time the device or particular application thereof is powered on or opened, respectively), or any suitable intermediate, which may be configurable by the user.

Pointing tool 250 may be centered about the point of contact ascertained by touch screen 240. In the illustration of FIG. 2, the user is contacting touch screen with a finger, and pointing tool is centered about the user's finger contact. In an embodiment in which pointing tool 250 is continuously displayed, user places a finger or stylus/pen near the center of the pointing tool 250 and computer system 210 may thereafter center pointing tool 250 about that point of contact, or may not center the pointing tool about the contact but allow user to move the pointing tool 250 so long as the contact is within a given are (for example, with a finger pad area, described further herein). In another embodiment, pointing tool 250 first appears and is centered about a first point of contact responsive to ascertaining the first point of contact.

Figure 3:
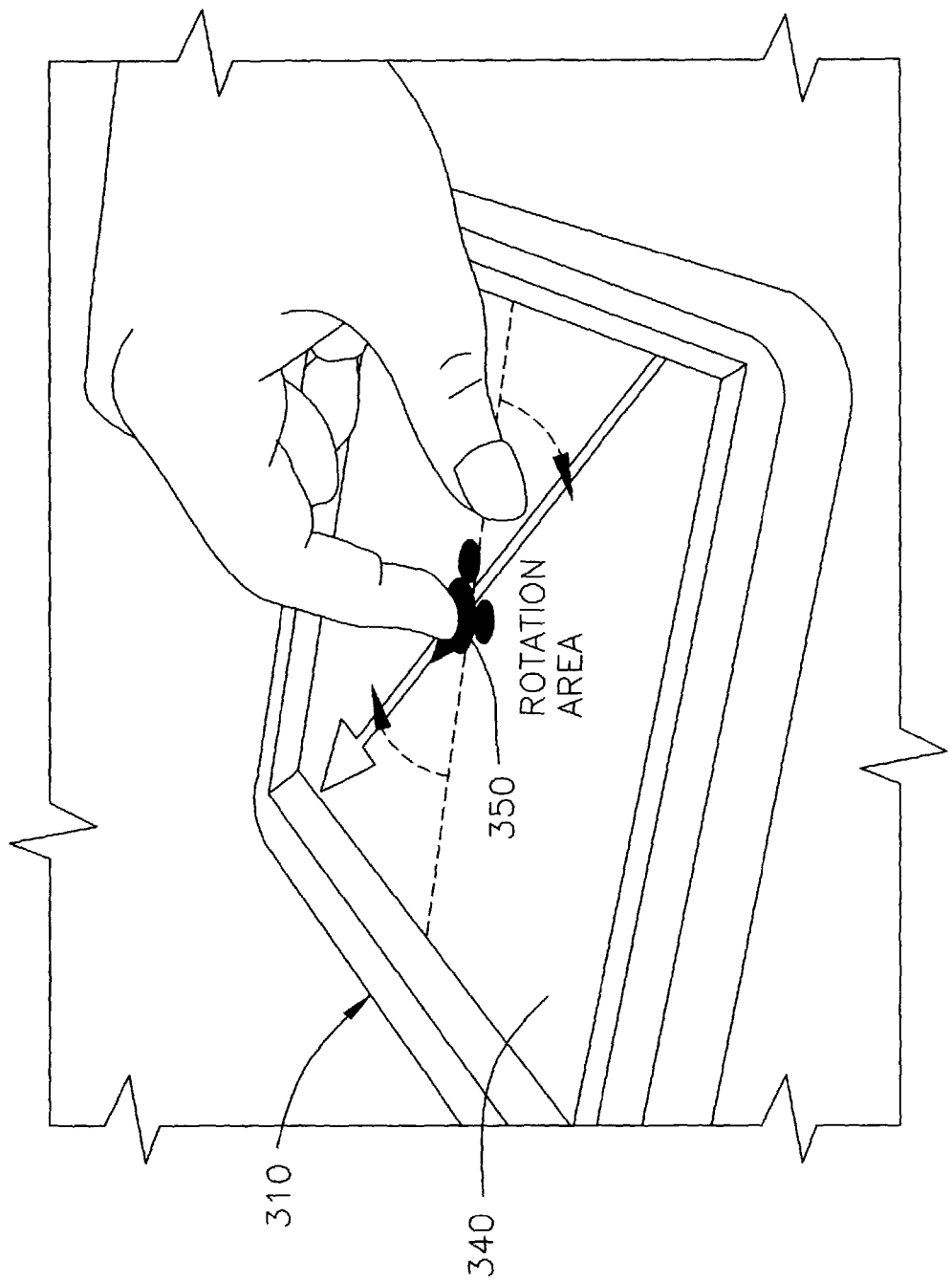
FIG. 3 illustrates a computer system having an example pointing tool in a second orientation.

Pointing device 250 may be oriented with a pointing tip at one end and one or more buttons at another end (further described in connection with the example illustrated in FIG. 4). FIG. 2 illustrates an initial position for pointing tool 250. That is, when user first contacts touch screen 240 in order to utilize pointing tool 250 to provide input, computing device 210 may center pointing tool 250 about the point of contact. As illustrated, the pointer tip is oriented to one end of pointing tool, and buttons are oriented to another end of the pointing tool. In FIGS. 2-3, an arrow is included in these figures to indicate the general orientation of the pointer tip.

In the example embodiment illustrated in FIG. 3, computing device 310, in addition to positioning the pointing tool 350 about the point of contact, defines one or more rotation areas. The rotation areas can be located in essentially any area of the touch screen 340, including above the pointing tool 350, below the pointing tool 350, or within the pointing tool 350. Moreover, rotation input, described further herein, may be provided through another input device (that is, outside of the touch screen 340).

In the example illustrated in FIG. 3, computing device defines a rotation area below buttons on pointing tool 250. When the user provides input(s) in the rotation area(s), such as sweeping input (to the left as illustrated by curved arrow appearing near the user's thumb in FIG. 3), computing device 310 rotates pointer tip about a central point (for example, the first contact/input detected), such that the pointing tool 250 may be rotated by easy manipulation on touch screen 240. As an example, the user contacting the finger pad (refer to FIG. 4) provides a central point about which the pointing device is centered. If the user maintains contact with the pointing tool and additionally provides rotation input, as for example via a rotation area on the touch screen, the computing device 310 rotates the pointing tool 350 about the central point, allowing the pointing tip to rotate. If the user lifts his or her hand from the touch screen, then provides rotation input, the computing device 310 may rotate the pointing tool 350 about the last known center contact point.

In any event, rotation is illustrated in FIG. 3 by the curved arrow appearing above the user's index finger. Such rotation of the pointing tool 350 allows the user to point at and provide input via all areas of the touch screen 340, even those oriented 'underneath' the pointing tool 340 initially.

Figure 4:
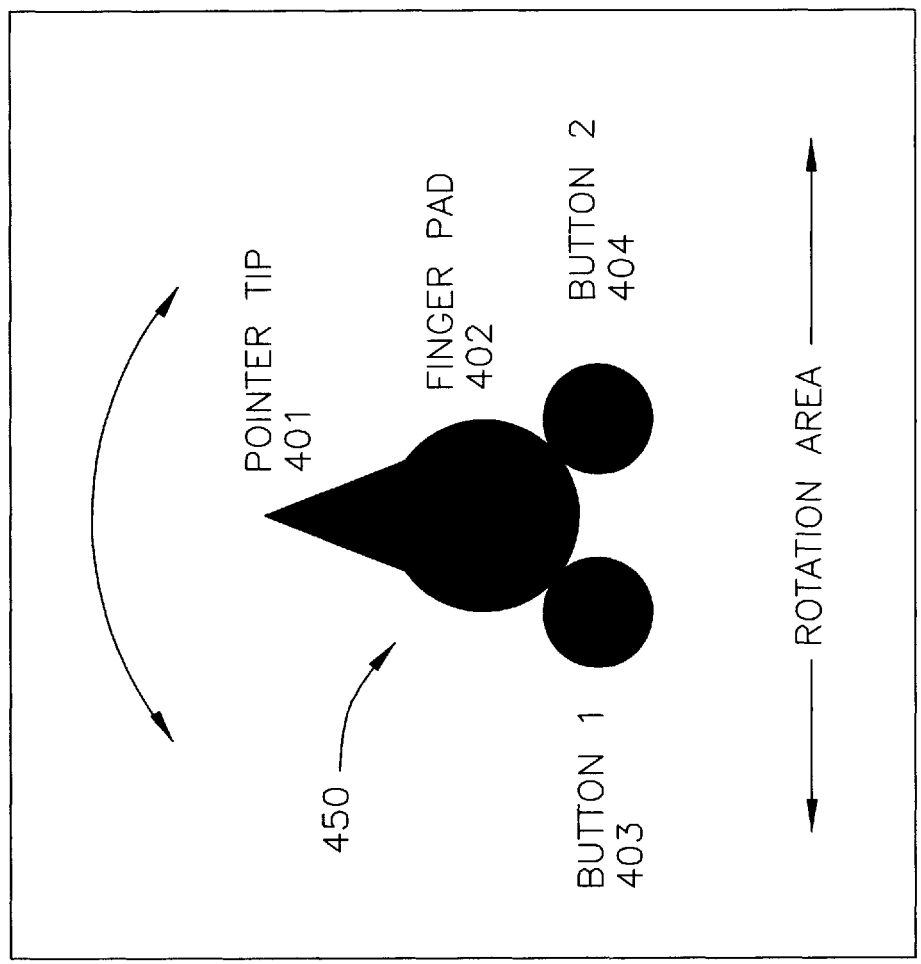
FIG. 4 illustrates an example pointing tool.

In FIG. 4, an example pointing tool 450 is illustrated. The example pointing tool 450 includes a pointer tip 401, a finger pad 402, and one or more buttons (403, 404). The pointer tip 401 is the equivalent of the tip of a conventional pointer, for example a mouse cursor; that is, the pointer tip indicates the position of the pointing tool 450 for selecting, drawing, coloring, et cetera.

Associated with pointing tool 450 are one or more predefined areas, such as a rotation area, though other predefined areas are possible. Pointer tip 401 is visually offset from the finger pad 402, where user makes contact to move the pointing tool 450. As described, the computing device may center finger pad 402 about the point of contact. The finger pad 402 is visually connected to but offset from pointer tip 401, providing an offset pointer tip 401 that is visually easy to control due to visual connection with finger pad 402. The finger pad 402 permits users to conveniently contact and move the pointing tool 450 about the touch screen while having a clear visualization of the pointer tip 401. Moreover, as used in connection with a multi-touch touch screen, user may keep a finger in contact with the finger pad 402 portion of the pointing tool 450 and provide other inputs, such as rotation input and/or button input using another finger.

Pointing tool 450 may include one or more buttons 403, 404 that when contacted execute one or more predetermined functions/operations. The predetermined functions are user configurable and may include selection, color change, right click, left click, et cetera. The buttons 403, 404 may be visually connected with pointing tool 450 as 'virtual' buttons. Moreover, pointing tool 450 may operate in connection with one or more physical buttons logically associated therewith, such as those commonly provided with clamshell laptops in connection with touch pad devices. Thus, pointing tool 450 may include virtual buttons visually associated or connected to other portions of the pointing tool, pointing tool 450 may operate in combination with one or more physical buttons logically associated therewith, or any suitable combination of the foregoing.

Since a user's fingers move with the hand, having buttons 403, 404 visually connected to the pointing tool 450, for example visually connected to the finger pad 402, ensures that the buttons 403, 404 are easy to located an access while manipulating the pointing tool 450. However, other locations for virtual buttons placed on the touch screen, and/or physical buttons provided on the computing device, are acceptable and may be preferable in certain contexts, such as when a user desires/prefers to use two hands to execute operations. Moreover, the buttons may be swappable (bindable), for example, allowing the user to change predefined defaults or assign new and/or different functions to the buttons.

Figure 5:
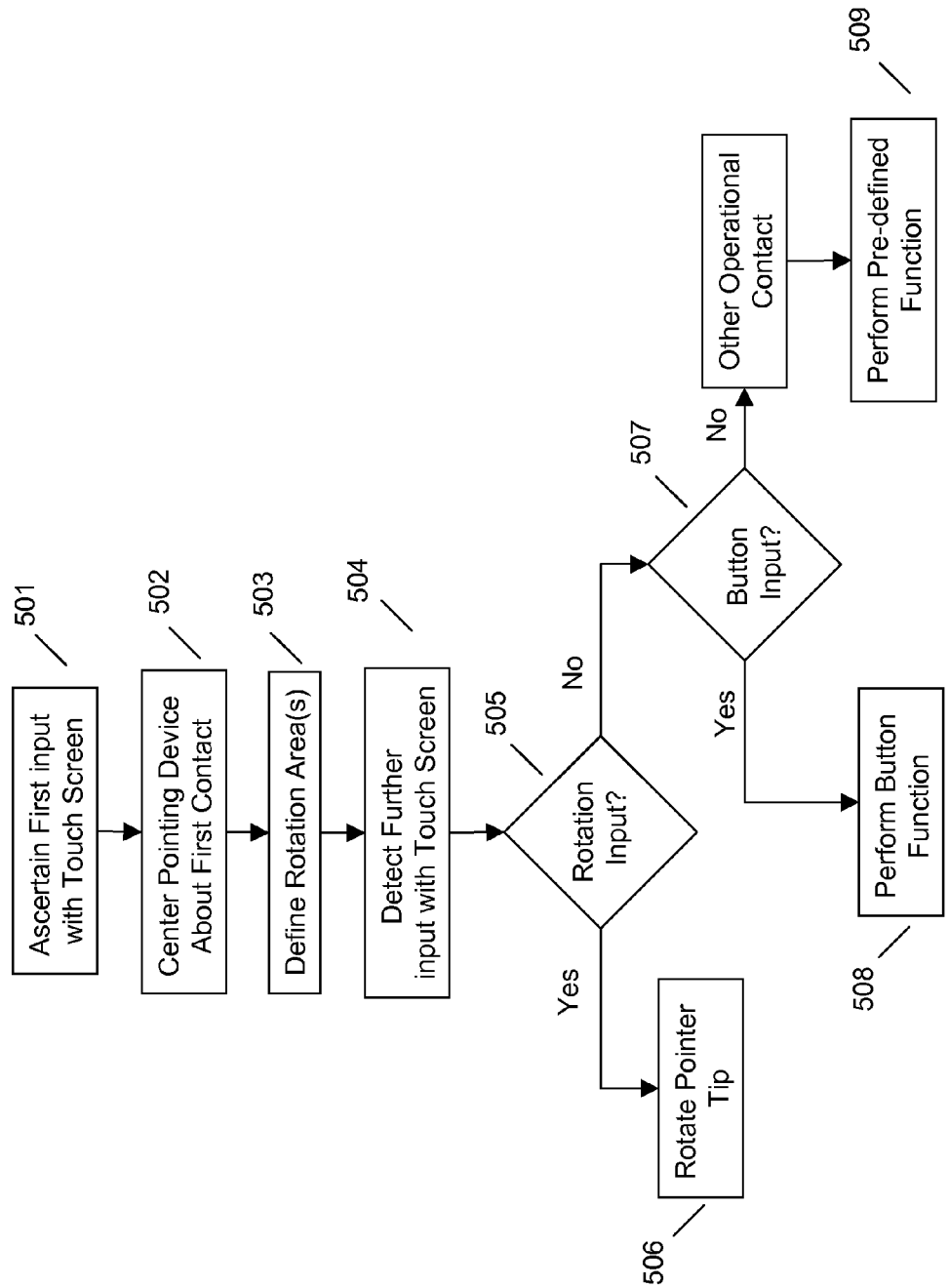
FIG. 5 illustrates an example method of providing and using a pointing tool.

FIG. 5 illustrates an example method of providing and using a pointing tool as described herein. At 501, a computing device ascertains contact (input) with a touch screen. As described herein, pointing tool may appear responsive to said ascertaining, or may be continuously displayed on the touch screen. For continuous display, a default orientation could include a centered display on the screen with pointer tip pointing up and button(s), if any, oriented downward. Responsive to ascertaining contact with the touch screen, the pointing tool may be centered about the point of contact at 502. For example, computing device centers display of finger pad portion of pointing tool about the point of contact.

The pointing tool may be oriented in a variety of ways. Given the orientation of pointing tool, areas can be defined about the pointing tool. For example, a rotation area is defined by computing device at 503. As an example, a rotation area may be defined below the pointing tool such that the user may rotate the pointing tool, and thus pointer tip, by sweeping his or her thumb below the pointer tool.

Responsive to detecting further user input 504, computing device executes an appropriate function given the type of input detected. For example, if rotation input is detected 505, as for example by user sweeping thumb beneath the pointing tool, the pointing tool and thus pointer tip is rotated 506. If a button input is detected 507, as for example by the user contacting a virtual button portion of the pointing tool, computing device performs a predefined function associated with the button 508. If the input is neither button nor rotation input, computing device performs the predefined function 509. For example, the user can simply move the pointer tool to another location on the touch screen by dragging the finger pad.

Embodiments thus provide a pointer tool for use in connection with a computing device having a touch screen. Embodiments may be implemented as a system, method, apparatus or computer program product. Accordingly, various embodiments may take the form of an entirely hardware embodiment, an entirely software embodiment (including firmware, resident software, micro-code, etc.) or an embodiment combining software and hardware aspects. Furthermore, embodiments may take the form of a computer program product embodied in one or more computer readable medium(s) having computer readable program code embodied therewith.

Any combination of one or more computer readable medium(s) may be utilized. The computer readable medium may be a non-signal computer readable storage medium. A non-signal computer readable storage medium may be, for example, but not limited to, an electronic, magnetic, optical, electromagnetic, infrared, or semiconductor system, apparatus, or device, or any suitable combination of the foregoing. A computer readable storage medium may be any non-signal medium that can contain or store a program for use by or in connection with an instruction execution system, apparatus, or device.

Computer program code for carrying out operations of various embodiments may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made through an external computer.

It will be understood that embodiments may be implemented by a device such as a computer executing a program of instructions. These computer program instructions may be provided to a processor of a special purpose computer, or other programmable data processing apparatus, to produce a machine, such that the instructions, which execute via the processor of the computer or other programmable data processing apparatus, implement the functions/acts specified.

These computer program instructions may also be stored in a non-signal computer readable medium that can direct a computer, other programmable data processing apparatus, or other devices, to function in a particular manner, such that the instructions stored in the computer readable medium produce an article of manufacture including instructions which implement the function/act specified.

The computer program instructions may also be loaded onto a computer, other programmable data processing apparatus, or the like, to produce a computer implemented process, such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative example embodiments have been described herein, it is to be understood that the claims are not limited to those precise example embodiments, and that various other changes and modifications may be affected therein by one skilled in the art without departing from the scope or spirit of the disclosure.

What is claimed is:

1. A method of providing a pointing tool on a touch screen, the method comprising:
   ascertaining a first input with a touch screen;
   displaying a pointing tool on the touch screen responsive to the first input, the displayed pointing tool being centered about a point of contact of the first input and including:
   a pointer tip that rotates about a central point of the displayed pointing tool responsive to an input provided to the touch screen outside of the displayed pointing tool; and
   a finger pad portion of the displayed pointing tool that responds to user input thereto with manipulation of positioning of the displayed pointing tool on the touch screen; and
   responsive to ascertaining operational input provided by the displayed pointing tool, performing one or more operations on an object displayed in the touch screen.

2. The method according to claim 1, further comprising:
   defining a rotation area on the touch screen; and
   rotating the pointer tip responsive to an input with the touch screen in the rotation area.

3. The method according to claim 1, further comprising providing one or more buttons for user input.

4. The method according to claim 3, wherein the one or more buttons are logically associated with the pointing tool.

5. The method according to claim 3, wherein the one or more buttons are visually connected to the pointing tool on the touch screen.

6. The method according to claim 1, wherein the one or more operations comprise an operation associated with selection of one or more buttons associated with the pointing tool.

7. The method according to claim 1, wherein the operational input comprises user provided movement input associated with the finger pad; and
   wherein the one or more operations comprise moving the pointing tool according to the movement input.

8. The method according to claim 1, wherein the touch screen is a multi-touch touch screen, and further wherein the first input and the operational input are simultaneously ascertainable.

9. An apparatus comprising:
   one or more processors;
   a memory operatively connected to the one or more processors; and
   a touch screen operatively connected to the one or more processors;
   wherein, responsive to execution of instructions accessible to the one or more processors, the one or more processors are configured to:
   ascertain a first input with the touch screen;
   display a pointing tool on the touch screen responsive to the first input, the displayed pointing tool being centered about a point of contact of the first input and including:
   a pointer tip that rotates about a central point of the displayed pointing tool responsive to an input provided to the touch screen outside of the displayed pointing tool; and
   a finger pad portion of the displayed pointing tool that responds to user input thereto with manipulation of positioning of the displayed pointing tool on the touch screen; and
   responsive to ascertaining operational input provided by the displayed pointing tool, perform one or more operations on an object displayed in the touch screen.

10. The apparatus according to claim 9, wherein the one or more processors are further configured to:
    define a rotation area on the touch screen; and
    rotate the pointer tip responsive to an input with the touch screen in the rotation area.

11. The apparatus according to claim 9, wherein the one or more processors are further configured to:
    provide one or more buttons for user input.

12. The apparatus according to claim 11, wherein the one or more buttons are visually connected to the pointing tool on the touch screen.

13. The apparatus according to claim 10, wherein the one or more operations comprise an operation associated with selection of one or more buttons associated with the pointing tool.

14. The apparatus according to claim 9, wherein the operational input comprises user provided movement input associated with the finger pad; and
    wherein the one or more operations comprise moving the pointing tool according to the movement input.

15. The apparatus according to claim 9, wherein the touch screen is a multi-touch touch screen, and further wherein the first input and the operational input are simultaneously ascertainable.

16. A computer program product comprising:
    a non-transitory computer readable storage medium having computer readable program code embodied therewith, the computer readable program code comprising:

computer readable program code configured to ascertain a first input with a touch screen;

computer readable program code configured to display a pointing tool on the touch screen responsive to the first input, the displayed pointing tool being centered about a point of contact of the first input and including:

a pointer tip that rotates about a central point of the displayed pointing tool responsive to an input provided to the touch screen outside of the displayed pointing tool; and a finger pad portion of the displayed pointing tool that responds to user input thereto with manipulation of positioning of the displayed pointing tool on the touch screen; and computer readable program code configured to, responsive to ascertaining operational input provided by the displayed pointing tool, perform one or more operations on an object displayed in the touch screen.

17. The computer program product according to claim 16, wherein the pointing tool further comprises one or more buttons for executing one or more operations.

18. The computer program product according to claim 16, further comprising:

computer readable program code configured to define a rotation area on the touch screen; and computer readable program code configured to rotate the pointer tip responsive to an input with the touch screen in the rotation area.

\* \* \* \* \*